(12) United States Patent
Gruss et al.

(10) Patent No.: US 8,807,644 B2
(45) Date of Patent: Aug. 19, 2014

(54) SUNROOF POSITIONING AND TIMING ELEMENTS

(71) Applicant: Tesla Motors, Inc., Palo Alto, CA (US)

(72) Inventors: Matthew Paul Gruss, San Francisco, CA (US); Marcus Christensen, Davisburg, MI (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

(21) Appl. No.: 13/629,392

(22) Filed: Sep. 27, 2012

(65) Prior Publication Data

US 2013/0088051 A1  Apr. 11, 2013

Related U.S. Application Data

(60) Provisional application No. 61/541,021, filed on Sep. 29, 2011.

(51) Int. Cl.
*B60J 7/057* (2006.01)
*B60J 7/043* (2006.01)

(52) U.S. Cl.
CPC .............. *B60J 7/0573* (2013.01); *B60J 7/0435* (2013.01)
USPC ........................ 296/223; 296/216.08; 296/224

(58) Field of Classification Search
USPC .............................................. 296/216.01–224
See application file for complete search history.

(56) References Cited

U.S. PATENT DOCUMENTS

| | | | | |
|---|---|---|---|---|
| 4,602,815 | A | * | 7/1986 | Boots et al. ................... 296/222 |
| 6,345,860 | B1 | * | 2/2002 | Adam et al. ................... 296/223 |
| 2009/0039682 | A1 | * | 2/2009 | Ito et al. ................... 296/216.02 |

* cited by examiner

*Primary Examiner* — Dennis H Pedder
(74) *Attorney, Agent, or Firm* — J. Richard Soderberg

(57) ABSTRACT

Continuous cross sectional profile guide tracks in an outer sliding sunroof/moonroof are provided where both the front and rear mechanism or mechanism links travel fore/aft in the same channels as each other and have fore/aft travel that is limited only by vehicle architecture. The guide track channel is partly or entirely outside/outboard of the primary water/wind sealing system of the sunroof.

8 Claims, 11 Drawing Sheets

SUNROOF POSITIONING AND TIMING ELEMENTS

CROSS REFERENCE TO RELATED APPLICATIONS

This Application claims the benefit of U.S. Provisional Application 61/541,021 filed on Sep. 29, 2011, the contents of which are all expressly incorporated by reference thereto in its entirety for all purposes.

This application is related to co-pending U.S. application Ser. No. 13/628,980 that claims benefit of U.S. Provisional Application 61/540,557 filed on Sep. 29, 2011, co-pending U.S. application Ser. No. 13/629,169 that claims benefit of U.S. Provisional Application 61/540,648 filed on Sep. 29, 2011, co-pending U.S. application Ser. No. 13/629,238 that claims benefit of U.S. Provisional Application 61/540,758 filed on Sep. 29, 2011, and co-pending U.S. application Ser. No. 13/629,248 that claims benefit of U.S. Provisional Application 61/540,930 filed on Sep. 29, 2011, the contents of which are all expressly incorporated by reference thereto in their entireties for all purposes.

FIELD OF THE INVENTION

The present invention relates generally to passenger compartments, and more specifically, but not exclusively, to a moveable roof track assembly of a passenger vehicle.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Outer sliding panels (also commonly referred to as sunroofs, moonroofs, panorama roofs, panoramic roofs and other trade names herein referred to generically as a sunroof) are sunroofs where a movable panel (made of glass, sheet metal, metal reinforcements, polycarbonate or a combination of these or similar materials), from its closed position, lifts or tilts and then moves into a position above a fixed panel where it effectively provides an opening in the roof to the outside air. This can give occupants the feel of openness towards the sky similar to a retracted convertible top. The larger the open air opening ("hands through opening") and the larger the transparent opening when the moving panel is closed ("day light opening") the more value is gained regarding this feeling.

Typical outer sliding sunroof designs use a kinematic system mounted at a roof line to control opening and closing of the sunroof. The kinematic system often includes a mechanical assembly driven by a motor. Placement of the kinematic system at the roof line (which is close to the head of a vehicle operator and passengers) reduces a volume of the passenger compartment while increasing the interior noise level to the operator and passengers. To reduce these effects, additional soundproofing is used, which further limits the volume and a torque capability of the motor is constrained because increases in torque capability increase size and noise. The increasing size, and soundproofing to counter noise both further reduce the volume.

A common problem with sunroofs is alignment between the connected left hand and right hand sliding mechanisms. This can especially be the case over time as the parts become looser and/or when manufacturing processes are not tightly controlled during the initial assembly. Left hand to right hand misalignment of the sliding mechanisms can be cause for 1) unpleasant (shaky) type movement of the sunroof, 2) high loads and greater vehicle power required to drive the sunroof system, and 3) "No-op" conditions should misalignment become so severe that the drive motor is unable to overcome it. Another common problem with sunroofs is maintaining consistent and reliable fore-aft positions of the guide mechanism. Typically for large outer sliding roof systems, the motors are stopped at pre-programmed positions corresponding to full close and full open via control software. This requires that the software know the sunroof system extremely well and that the software be able to adapt to changing circumstances, for instance, parts become looser and there is less effort required for the motors to drive the system, or, conversely if the system becomes more difficult to cycle do to foreign matter (i.e. dust/dirt) coming inside the mechanism guide tracks. These are the types of events that will occur and software alone cannot be perfectly able to accommodate these changes without having to have re-initialization events. This can lead to degradation of the close and open position reliability and repeatability as compared to that of the design intent conditions.

What is needed is a system and method for improving sunroof implementations to increase hands through opening and day light opening characteristics while reducing constraints of the kinematic system on these characteristics.

BRIEF SUMMARY OF THE INVENTION

Disclosed is a system and method for a system and method for improving sunroof implementations to increase "hands through opening" and "day light opening" characteristics while reducing constraints of the kinematic system on these characteristics.

The following summary of the invention is provided to facilitate an understanding of some of technical features related to sunroof implementations, and is not intended to be a full description of the present invention. A full appreciation of the various aspects of the invention can be gained by taking the entire specification, claims, drawings, and abstract as a whole. The present invention is applicable to other passenger compartments.

A moveable panel system for a roof of a passenger compartment of a vehicle, including a roof wall of the vehicle having a left lateral edge, a right lateral edge, a front edge, and a rear edge with said roof wall defining a passenger compartment opening between said edges; a pair of fore/aft path controls disposed in said roof wall and longitudinally extending from said front edge towards said rear edge including a left path control extending from a front left path limit along said left lateral edge to a rear left path limit and a right path control extending a front right path limit along said right lateral edge to a rear right path limit; a plurality of hardstops, one hardstop disposed at each said path limit; a panel sized to close said opening; a set of mechanical linkages disposed in said path controls and moveably coupling said panel to said path controls, said set of mechanical linkages including a left mechanical linkage coupled to a left side of said panel and a right mechanical linkage coupled to a right side of said panel; a left mechanical interface coupled to said left mechanical linkage having an open mode that moves said left side towards said rear edge and said left mechanical interface having a close mode that moves said left side towards said front edge; a right mechanical interface, independent from said left mechanical interface, coupled to said right mechanical linkage having an open mode that moves said right side towards said rear edge and said right mechanical interface having a close mode that moves said right side towards said front edge; a pair of motors mounted to the vehicle responsive to a plurality of motor control signals, said pair of motors including a left motor coupled to said left mechanical interface and controlling said modes of said left mechanical interface and including a right motor coupled to said right mechanical interface and controlling said modes of said right mechanical interface; and a motor controller coupled to said motors and generating said plurality of motor control signals including an open control signal and a closed control signal with said open control signal causing said motors to operate their coupled mechanical interfaces in said open mode and with said close control signal causing said motors to operate their coupled mechanical interfaces in said close mode; wherein said open mode drives said mechanical linkages in physical contact with a first particular pair of hardstops of said plurality of hardstops; and wherein said closed mode drives said mechanical linkages in physical contact with a second particular pair of hardstops of said plurality of hardstops, said second particular pair not including hardstops from said first particular pair.

The embodiments of the present invention described herein provides a continuous cross sectional profile guide tracks in an outer sliding sunroof where both the front and rear mechanism or mechanism links travel fore/aft in the same channels as each other and have fore/aft travel that is limited only by the vehicle architecture. This guide track channel is partly or entirely outside/outboard of the primary water/wind sealing system of the sunroof. The movement of the panel coupled to the mechanisms is driven by two independent motors installed below a roof line, which further increases the potential opening size, enlarges the headroom of the passenger compartment, and reduces noise for the passengers. Strategically disposed hardstops at path limits for physical contact with the linkages at the full open and full close position automatically realign the sunroof to its nominal optimally designed orientation.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

There are several advantages to bringing the mechanism against a stop position during each close or open event. This is especially the case when done in combination with independent left hand and right hand motors: 1) Each time the sunroof is brought to either full close or full open, a re-alignment event occurs and the left hand and right hand mechanisms are brought back to perfect harmony despite frictional differences that may be present between the left hand and right hand mechanism sliding systems; 2) Including the hard stops provides for a reliable and repeatable position each time for the movable panel (the effects of friction, panel inertia, mechanisms tightening or loosening, and software no being in harmony with these factors are reduced/eliminated); 3) Any concern regarding damage to the mechanism over time may be compensated by use of a control via software to limit the amount the motors may push or pull in regions close to the hardstops; 4) Integration of the closed position hard stops into a functional and structural role maintains advantages of larger daylight/hands' through opening size; and 5) Fit and finish repeatability is improved over software "soft stops" and compensates for flexible cable hysteresis arising from positional variations due compression or tension loading.

The present invention eliminates environment seal limitations on hands through and day light opening dimensions while simplifies guide track complexity, assembly requirements, and cost. Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Embodiments of the present invention provide a system and method improving sunroof implementations to increase hands through opening and day light opening characteristics while reducing constraints of the kinematic system on these characteristics. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Some of these misalignment issues identified in the background may be heightened in the event that the left hand and right hand of the sunroof are moved by independent drive mechanisms. Referenced and incorporated co-pending US patent application number 13/629,348 describes use of two independent motors for a sunroof. Embodiments of the present invention may be used in such an architecture to minimize any potential issues of lateral misalignment.

Figure 1:
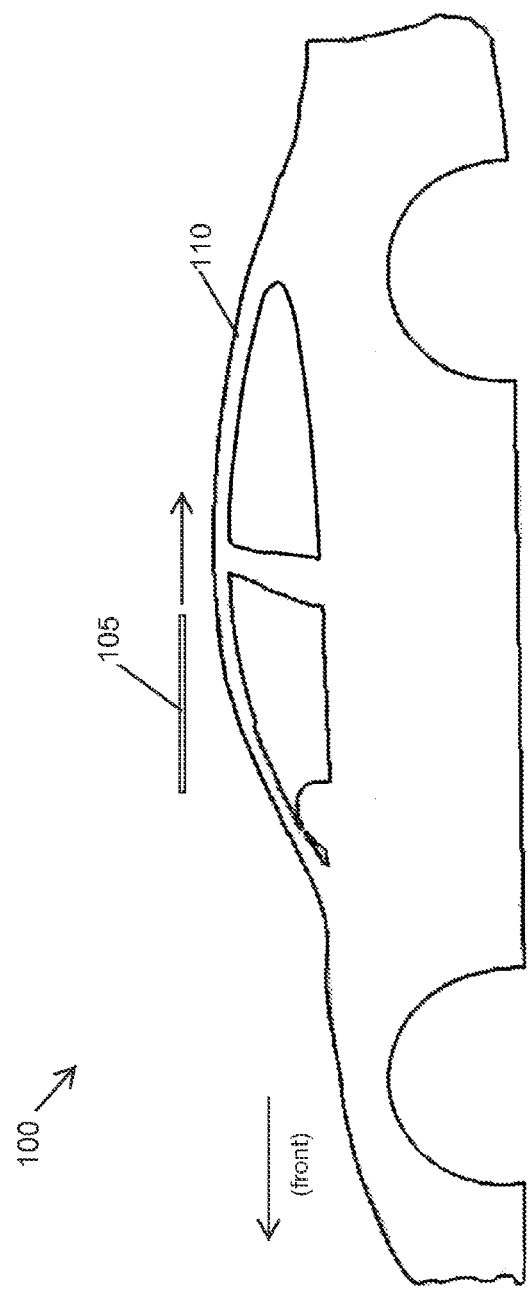
FIG. 1 illustrates a side profile of a vehicle passenger compartment outfitted with in-line outer sliding panorama sunroof tracks.

FIG. 1 illustrates a side profile of a vehicle passenger compartment 100 outfitted with a set of in-line outer sliding panorama sunroof tracks. A sunroof 105 installed in a roof portion 110 of compartment 100 moves fore and aft along the set of tracks. Sunroof 105 is shown schematically above roof portion 110 for ease in visualization but it is understood that it is moveably installed in roof portion 110 as shown and described elsewhere herein.

Figure 2:
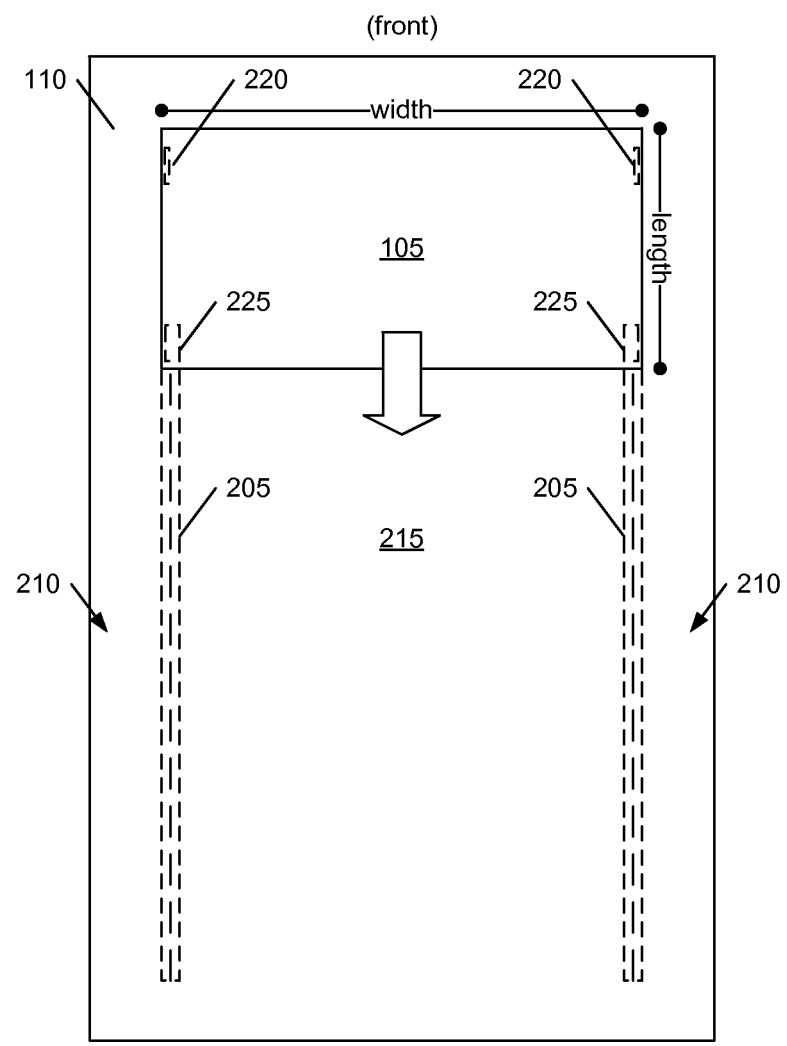
FIG. 2 illustrates a generic representation of a top view of the roof portion of the compartment illustrated in FIG. 1 with the sunroof in the closed mode.

FIG. 2 illustrates a generic schematic representation of a top view of roof portion 110 of compartment 100 illustrated in FIG. 1 with sunroof 105 in a closed mode. A sunroof track 205 is installed at lateral edges 210 of roof portion 110. Sunroof 105 is located above a forward seating area of compartment 100 and moves rearwardly over a region 215 of roof portion 110 when opened. Sunroof 105 provides an aerodynamic profile when closed, and therefore a rear edge of sunroof 105 is in-line with a front edge of region 215. To move rearwardly, sunroof 105 is required to rise up and out of this position when initiating the rearward opening motion to pass over region 215. Further, sunroof 105 drops down and into this position when finishing its closing action. Region 215 may be provided with a fixed moonroof or a solid panel over a rear seating or cargo compartment.

Track 205 is manufactured as a single continuous guiding assembly, such as for example, by an extrusion (e.g., metallic or plastic) process, a roll formation process, a machining process, or the like. Track 205 may be of any length and is installed as a parallel mirror complement to track 205 on an opposing lateral edge 210. The length of track 205 controls how far sunroof 105 may move (i.e., a fore/aft travel distance), which in turn influences a maximum length of sunroof 105. Sunroof 105 may be made longer the further that track 205 runs along lateral edge 210.

Each track 205 includes two parallel guide channels that run its entire length. Sunroof 105 is moveably coupled to these channels using linkage mechanisms that ride in these channels. Sunroof 105 includes a pair of forward linkages 220 (one for each track 205) and a pair of rearward linkages 225 (one for each track 205). In the preferred embodiment, forward linkage 220 and rearward linkage 225 for the same track 205 are disposed in the same physical channel, for example an outermost channel. Additionally, rearward linkage 225 is also disposed in an innermost channel. This enables rearward linkage 225 to independently interact with a lifting/lowering assembly (e.g., a cam or other structure) to lift the rearward edge of sunroof 105 when opening and to lower the rearward edge when closing.

The length of track 205 is affected by an architecture of compartment 100. In conventional systems, a sealing system for sunroof 105 limits the width/length as well as the fore/aft travel distance. In this implementation, the fore/aft travel distance of sunroof 105 is not limited by the sealing system (described later) but rather only limited by architectural demands (for example, a length of roof, a desired head room for the rear seat row(s), an inclusion of a hatchback frame, and a requirement to not continue the travel motion over the backlights or rear window, and the like).

Consequently sunroof 105 is able to achieve significantly larger hands through opening and day light opening sizes than one built with typical construction. Further, these embodiments greatly simplify assembly and manufacturability while allowing reductions in cost because fewer parts are required.

Figure 3:
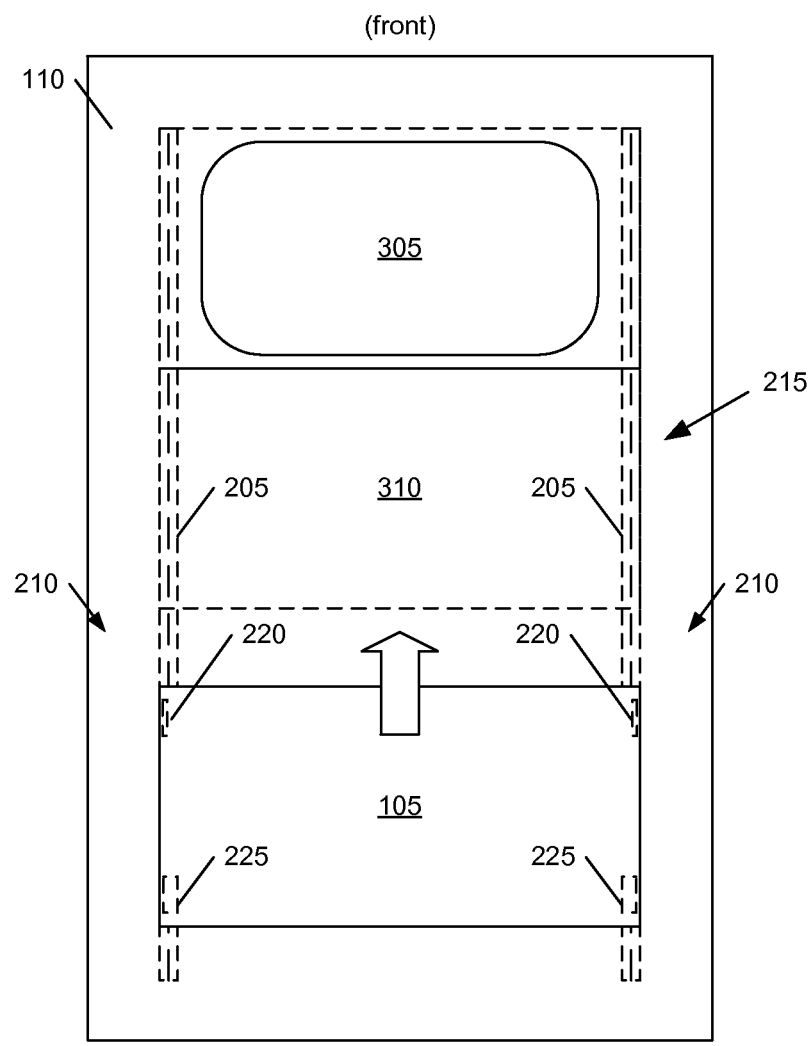
FIG. 3 illustrates the generic representation of FIG. 2 with the sunroof in the open mode.

FIG. 3 illustrates the generic representation of FIG. 2 with sunroof 105 in the open mode. When opened, sunroof 105 reveals a compartment opening 305 that had been previously covered and sealed against the environment. When track 205 is long enough, sunroof 105 may be moved far enough back to uncover enough of region 215 that an optional moonroof 310 in region 215 may be uncovered as well.

Figure 4:
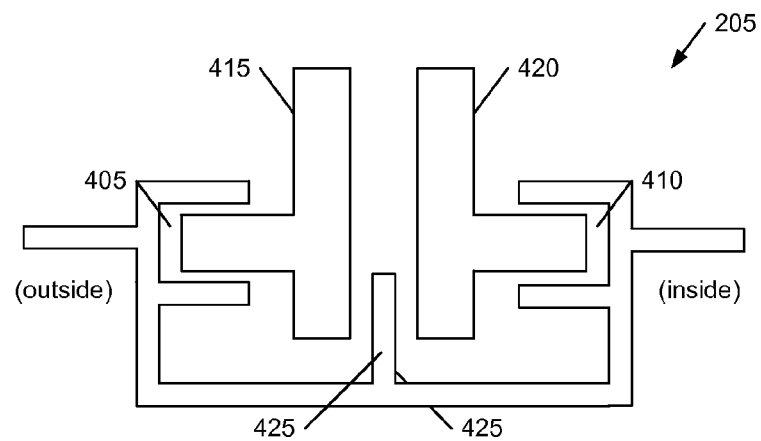
FIG. 4 illustrates a cross-sectional view of a sunroof track.

FIG. 4 illustrates a cross-sectional view of sunroof track 205 as looking from front-to-back of a left-hand-side track 205. Track 205 includes an outer continuous channel 405 and an inner continuous channel 410 rearward of a rear mechanism lifting/lowering cam. A representative outer channel engagement element 415 is duplicated in part of forward linkage 220 and in part of rearward linkage 225. A representative inner channel engagement element 420 is part of rearward linkage 225. A vertical guide rib 425 separates outer continuous channel 405 and inner continuous channel 410. Vertical guide rib 425 provides mechanical support and guidance for structures moving within the channels.

As discussed above, when sunroof 105 is opening, it must lift. This lifting is needed in order to provide clearance above region 215. In order for sunroof 105 to lift, it is actuated by lifting (or cam) elements to do so. These lifting elements are required to act upon both forward linkage 220 and rearward linkage 225. Forward linkage 220 is close to the front of sunroof 105 and when sunroof 105 is closed it is at the very forward end of track 205. Rearward linkage 225, when sunroof 105 is closed resides within track 205. In order to realize an unlimited opening potential, these embodiments provide channel 405 as one continuous guide channel in which both forward linkage 220 and rearward linkage 225 are guided inside. Channel 405 provides these linkages with appropriate mechanical support and guidance over the entire travel length of sunroof 105. These aspects are provided by the guide track design in combination with the design of rearward linkage 225 to initiate lifting when opening, and concluding lowering when closing, sunroof 105 with respect to opening 305.

Figure 5:
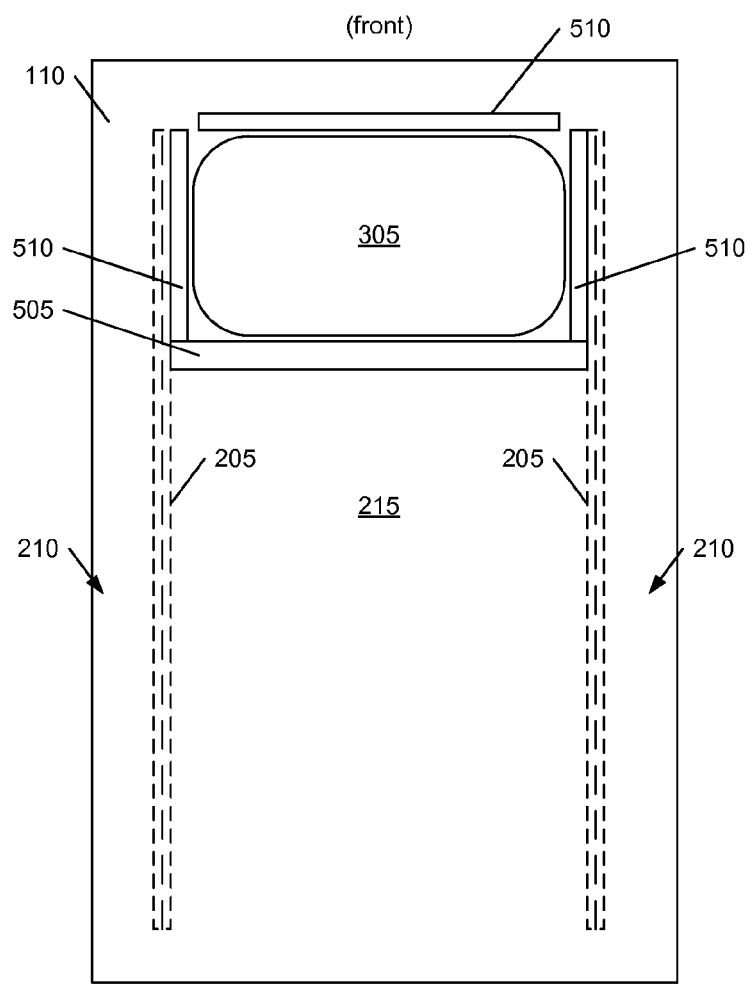
FIG. 5 illustrates the generic representation of FIG. 1 without top panels to reveal a structural cross-bow and sealing surfaces.

FIG. 5 illustrates the generic representation of FIG. 1 without sunroof 105 to reveal a structural cross bow 505 and a sealing surface 510. Cross bow 505 bridges a space of region 215 between tracks 205 without extending over either track 205. Cross bow 505 adds structural stability and strength, enhancing roof crush and side impact performance. Sealing surface 510 includes a compression seal cooperative with sunroof 105 when in the closed mode that provides environmental exclusion. While sealing surfaces are shown along lateral and edges, embodiments of the present invention may change, enhance, and/or remove some or all of the sealing surfaces to meet different performance and operational goals. Environmental components, such as wind noise and liquid elements (e.g., rain), are inhibited from entering opening 305 when sunroof 105 is closed and sealed. This arrangement of cross bow 505 and sealing surface 510 provides channel 405 and channel 410 of track 205 partly/entirely outside of the primary wind/water sealing system of roof portion 110. This, in turn, enables fore/aft travel of sunroof 105 to be limited only by vehicle architecture.

Preferably a mechanical/electromechanical system is coupled to the linkage mechanisms in order to move them. Movement of the linkage mechanisms operates sunroof 105 to move it between the closed mode and the opened mode. The mechanical/electromechanical system may be motorized or manually operated. Described below are representative kinematic systems that may be used to operate sunroof 105. Others systems are possible.

Figure 6:
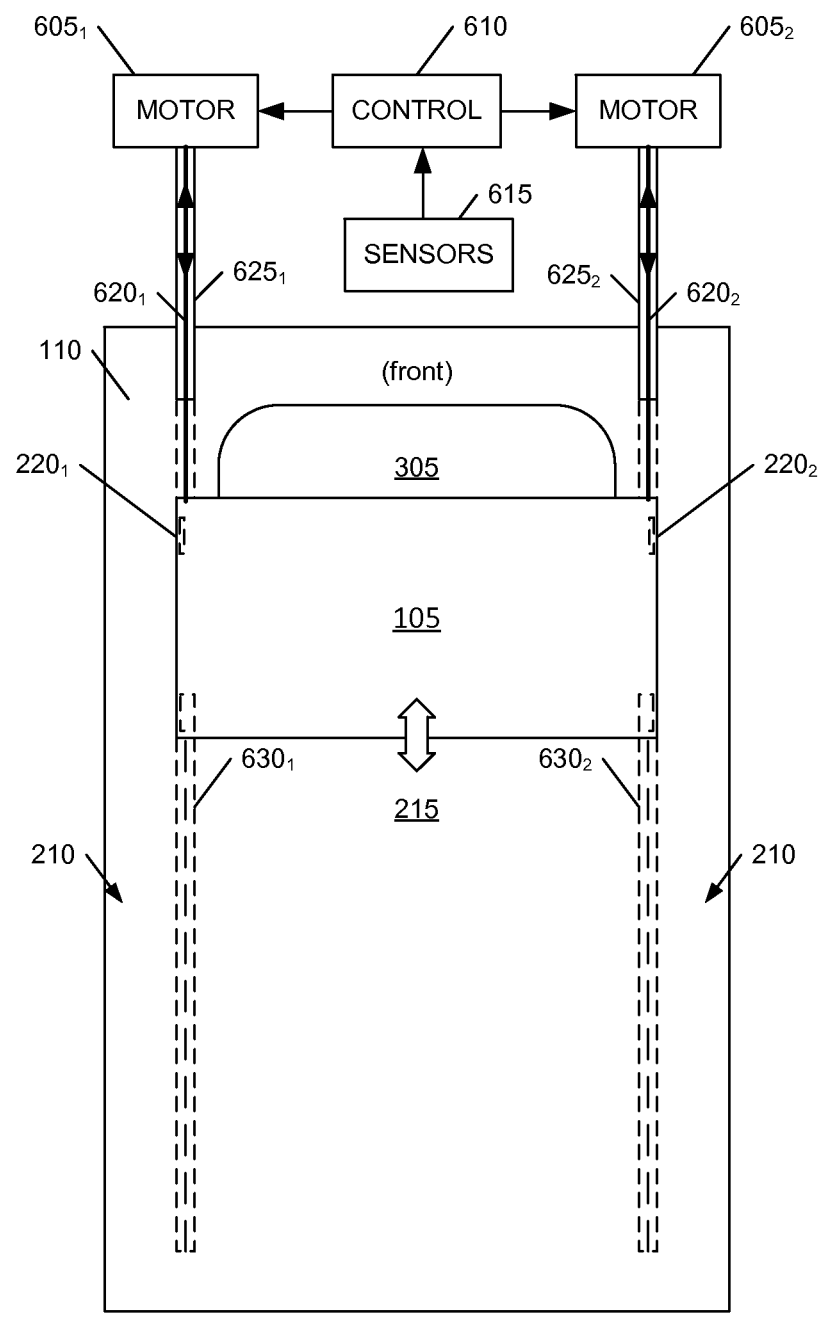
FIG. 6 illustrates a schematic block diagram of a kinematic system for controlling motion of the sunroof.

FIG. 6 illustrates a schematic block diagram of a kinematic system 600 for controlling motion of sunroof 105. Kinematic system 600 includes a pair of sunroof motors 605 (e.g., a left-hand motor $605_1$ and a right hand motor $605_2$) and a motor controller 610 coupled to each motor 605. Motors 605 are remotely-located relative to a roof line of the passenger compartment, with each motor 605 independently responsive to one or more control signals from controller 610. For purposes of this application, the roof line of a passenger compartment in a vehicle is defined by a plane passing through the upper ends of the pillars of the passenger compartment. Controller 610 generates the one or more control signals responsive to input from a sensor system 615. There are many different possible control systems that may be used. For example, controller may issue continuous "run" control signals which cause motor 605 to wind/unwind until controller 610 stops issuing the commands. In other systems, controller 610 may issue separate start and stop commands with motor 605 running until receiving a countervailing command. In still other systems, controller 610 issues a control signal with a particular position and motor 605 includes an encoder or other intelligence to move sunroof 105 to the commanded location. Sensor system 615 provides distributed sensors to measure opening, closing, motor speed, hand interference in opening 305, and other desired operational and performance metrics.

Each motor 605 is coupled to a forward linkage 220 by a flexible cable 620 running through a conduit 625. Cable 620 is sufficiently flexible to be wound around a reel or the like without undesirable amounts of plastic deformation due to loading (tension or compression) during movement of sunroof 105. Conduit 625 enables extension of cable 620 (e.g., when motor 605 unwinds cable 620 from a reel) to control a fore/aft location of its corresponding side of sunroof 105 without bending or buckling. When cable 620 exits conduit 625 for attachment to forward linkage 220, it enters into a conduit channel in a continuous track 630. Track 630 is an embodiment of track 205 that includes the conduit channel through which cable 620 operates. The conduit channel provides similar functionality as conduit 625 for that portion of cable 620 outside of conduit 625. In some implementations, an alternative mechanical coupling to cable 620 may provide the necessary mechanical interface of motor 605 to sunroof 105 (e.g., a mechanical worm drive or gear assembly or other actuating assembly).

Figure 7:
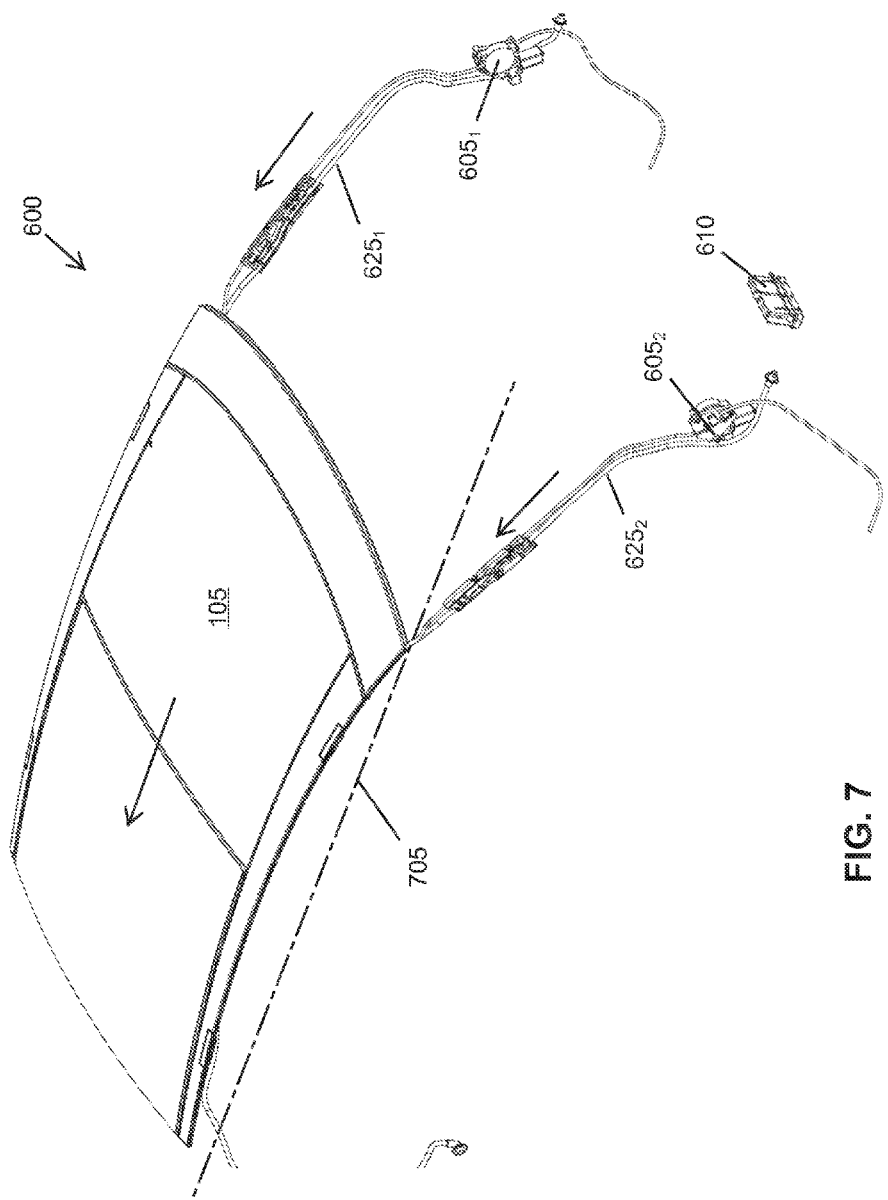
FIG. 7 illustrates a side perspective view of the kinematic system of FIG. 6.

FIG. 7 illustrates a side perspective view of kinematic system 600 of FIG. 6 installed into a passenger vehicle. Motors 605 are installed remotely from sunroof 105, one motor per side of the vehicle. Motors 605 are mounted to the body structure of the vehicle below a roof line 705, such as in a forward portion of the passenger compartment (e.g. behind the dash area below an area where a pillar A terminates, in a storage "trunk" area where a rearmost pillar terminates (e.g., pillar C), or the like). There are several pillars in a vehicle, with these pillars being vertical/near vertical structures supporting the roof. Pillars are designated by letters of the alphabet, starting at the front with "A."

In this case, the conduits are installed at the pillars (i.e., conduit $625_1$ installed at a left-hand side pillar A and conduit $625_2$ installed at a right-hand side pillar B). It is not required, but it is advantageous for operational and manufacturing reasons, to locate the motors and the conduits near forward-most or rearmost pillars.

In operation, each motor 605 moves its respective side of sunroof 105 independent of the other motor 605 from a location remote from, and below, the roof line. Controller 610 issues open control signals to both motors 605, each motor in response unwinds its associated cable 620. Unwinding cable 620 moves sunroof 105 rearward by driving forward linkages 220 rearward along track 630. Sensor system 615 may be used to inform motor 605/controller 610 (depending upon implementation) when to stop unwinding cable 620. Controller 610 issues close control signals to both motors 605, each motor in response winds its associated cable 620. Winding cable 620 moves sunroof 105 forward by pulling forward linkages 220 forward along track 630. Sensor system 615 may be used to inform motor 605/controller 610 (depending upon implementation) when to stop winding cable 620.

Figure 8:
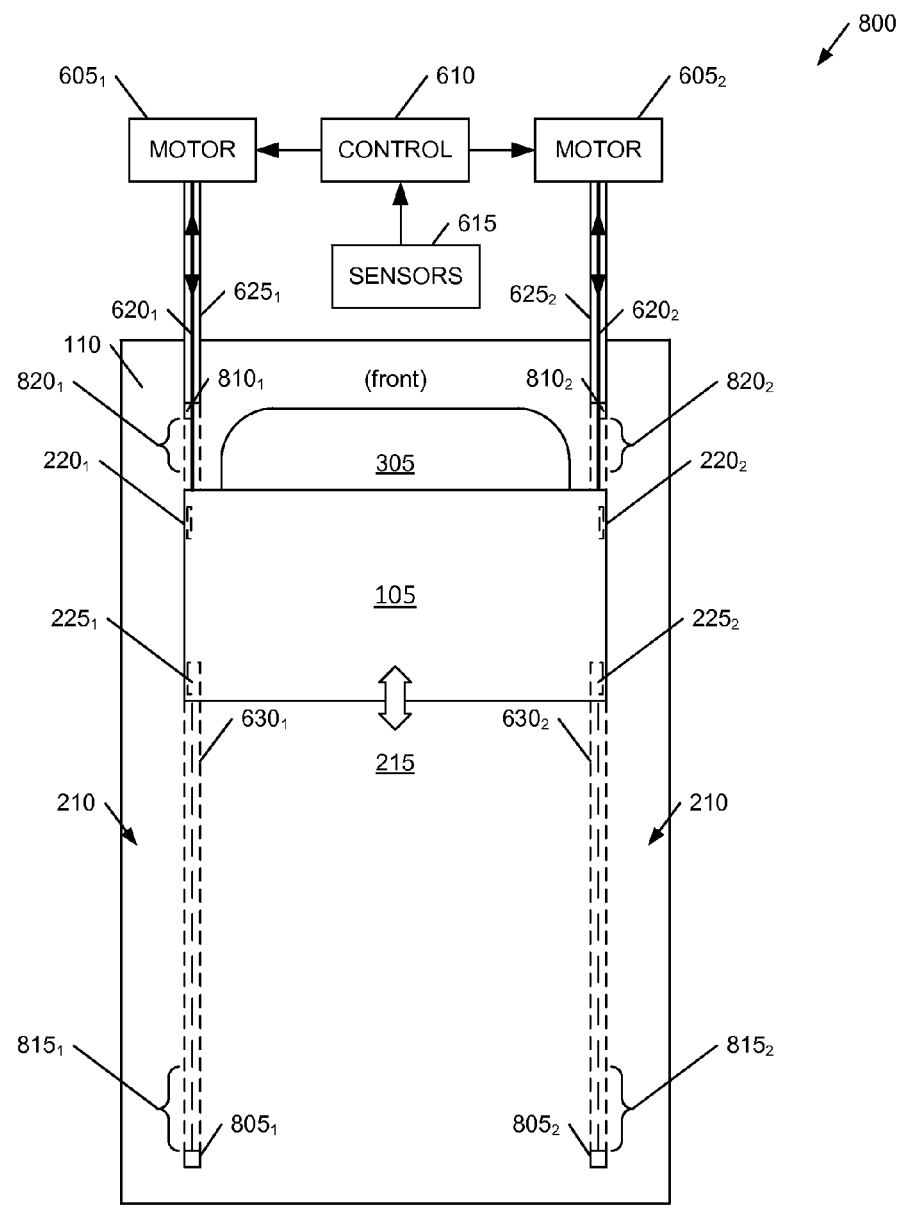
FIG. 8 illustrates a timing/positioning system for use with the kinematic system of FIG. 6.

FIG. 8 illustrates a timing/positioning system 800 for use with the kinematic system of FIG. 6. System 800 includes a pair of rear hardstops 805 (e.g., left hand rear hardstop $805_1$ and right hand rear hardstop $805_2$). Hardstops 805 are located in tracks 630 and positioned precisely for realigning interaction with sunroof 105 (or one of its linkages (e.g., rearward linkage 225)) upon each full open event. The locations of hardstops 805 are set so that when contacting structures at both sides of sunroof 105 contact hardstops 805, sunroof 105 has the desired lateral alignment and any lateral misalignment is automatically eliminated.

Hardstops may be implemented as bumpers (e.g., rubber or other polymer) or as a rigid structure. These hardstops may be installed into the tracks at the desired limits or in some cases the stops may be installed onto the portions of the mechanical linkages that could contact the end of the tracks.

System 800 also includes a pair of front hardstops 810 (e.g., left hand front hardstop $810_1$ and right hand front hardstop $810_2$). Hardstops 810 are located at the front portion tracks 630 and positioned precisely for realigning interaction with sunroof 105 (or one of its linkages (e.g., forward linkage 220)) upon each full close event. The locations of hardstops 810 are set so that when contacting structures at both sides of sunroof 105 contact hardstops 810, sunroof 105 has the desired lateral alignment at the perfect nominal design position, and any lateral misalignment is automatically eliminated.

As noted in referenced and incorporated co-pending U.S. patent application Ser. No. 13/629,169, the forward linkages 220 in some embodiments may actually move outside a front opening of track 630 and enter into an integrated cam structure or the like to control the lift/tilt profile of the forward edge of sunroof 105. In such cases, front hardstops 810 are disposed in the integrated cam structure as well. This would be true for the rear hardstops 805 in implementations having rear linkages exiting from track 630 for the fully open mode. Thus the tracks and any extension of the guiding path for the mechanical linkages are more generally defined as path controls, with the tracks providing most of that path control. The hardstops may be installed into the path controls at their limits, or installed on the linkages to interface to the limits of the path controls.

In operation, each time a full open or a full close event is commanded by controller 610, motors 605 drive each side of sunroof 105 against the respective hardstop. Any lateral misalignment is thus automatically eliminated as the hardstop locations are positioned to return sunroof 105 into the desired alignment for each full open and full close event. Subsequent operation of sunroof 105 then uses the optimally aligned sunroof 105 which reduces noise, power, and possibility of no-op events. Any operational characteristic differences between the left hand mechanical interface and the right hand mechanical interface (e.g., any frictional differences for the left hand and right hand mechanical linkages moving in tracks 630, drive differences in motors 605, panel inertia, tightening/loosening of mechanical components, and software used in the motors/controller and the like) are automatically compensated at each full open and each full close event.

Some embodiments may implement a refinement to the control of sunroof 105 as it approaches the hardstops. In some cases, there may be a concern about unduly stressing kinematic system 600 by extended periods of driving sunroof 105 against the hardstops. System 800 optionally includes restricted rear drive zones 815 (e.g., a restricted rear left drive zone 815$_1$ and a restricted rear right drive zone 815$_2$) and restricted front drive zones 820 (e.g., a restricted front left drive zone 820$_1$ and a restricted front right drive zone 820$_2$). Controller 610 limits an amount of pushing/pulling motors 605 may perform when the contacting portions of sunroof 105 enter into any of these restricted drive zones. The drive zones are shown much larger than necessary but are set to be close to the associated hardstop in each drive zone. Sensor system 615 may provide data for when sunroof 105 is entering into a drive zone or controller 610 may calculate that information and provide it to motors 605.

One of the features and design goals is maximizing passenger enjoyment of sunroof 105. In addition to the increased daylight and hands' free size opening, minimizing a thickness (depth) of sunroof 105 and its operational/functional support structures improves headroom. Various embodiments of the present invention have increased performance and operation of sunroof 105 by use of thinner, lighter weight materials than conventional sunroof materials. These materials include various plastics, polymers, thinner glass laminates, and the like are not only thinner and lighter (and may be enhanced with ultraviolet shielding and other environmental protections, but because of the enablement of larger-sized openings, produce a larger-sized sunroof. In some cases, the larger size and the lighter/thinner material can introduce a design issue as sunroof 105 may negatively impact vehicle noise, vibration, and harshness (NVH). Embodiments of the present invention may include a latching system incorporated into sunroof 105 and cross bow 505 (e.g., a "hook" on a rearward edge of sunroof 105 for selective engagement with/disengagement from a complementary "latch" on a midpoint location of cross bow 505). The latching system helps to reduce NVH factors by securing the trailing edge of sunroof 105 and enhancing any environmental sealing as well. The latching/unlatching is preferably automatic with closing/opening, respectively, sunroof 105.

Figure 9:
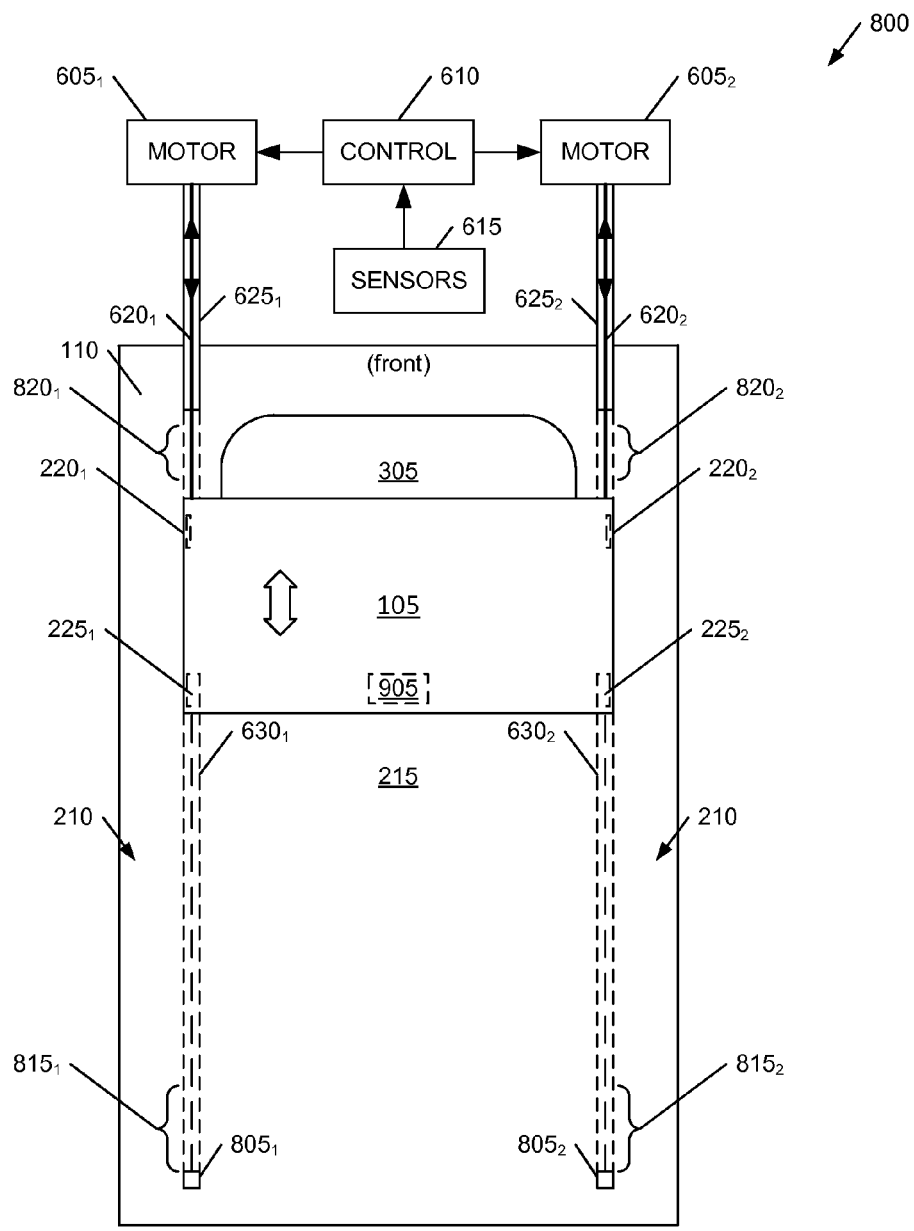
FIG. 9 illustrates an alternate timing/positioning system for use with the kinematic system of FIG. 6.

FIG. 9 illustrates an alternate timing/positioning system 900 for use with the kinematic system of FIG. 6 implementing a representative latching system. System 900 incorporates the components and operation of system 800 with modifications as described herein. System 900 includes a latch assembly 905 featured mid-point on a rearward edge of sunroof 105. Some embodiments may locate latch assembly 905 in a different location (e.g., a mid-point of a forward leading edge of sunroof 105) in addition to, or in lieu of, the illustrated location.

Figure 10:
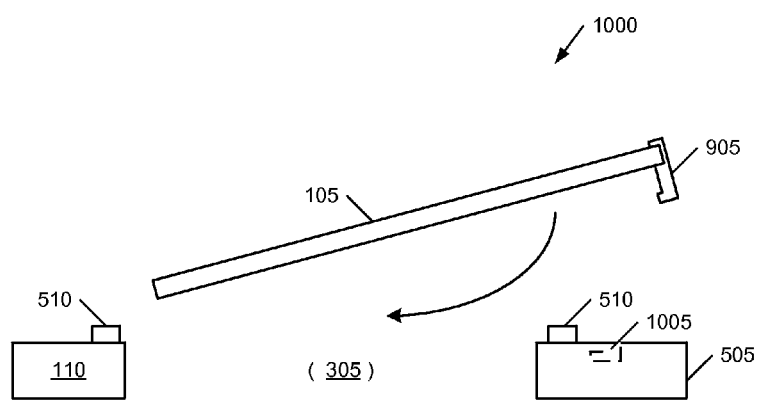
FIG. 10 illustrates a side view of the alternate timing/positioning system of FIG. 9 with the sunroof in a non-closed mode.
Figure 11:
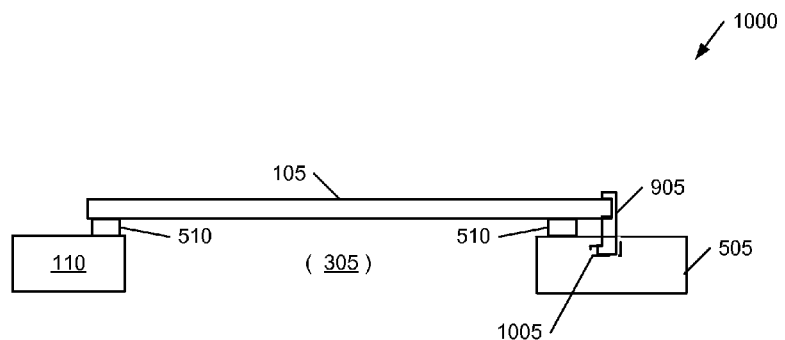
FIG. 11 illustrates the side view of the alternate timing/positioning system of FIG. 9 with the sunroof in the closed mode.

FIG. 10 illustrates a side view of a portion 1000 of alternate timing/positioning system 900 with sunroof 105 in a non-closed mode; and FIG. 11 illustrates portion 1000 of alternate timing/positioning system 900 with sunroof 105 in the closed mode. Latch assembly 905 engages a complementary latch engagement assembly 1005 when sunroof 105 closes and releases from latch engagement assembly 1005 when sunroof 105 opens. Latch engagement assembly 1005 is show coupled to (alternatively integrated into) cross bow 505, though other mounting structures are possible.

As described herein and in the incorporated related patent applications, sunroof 105 has an elevation/tilt profile that changes as sunroof 105 moves forward and rearward. The profile is determined in the preferred embodiment by mechanical linkages moving in lateral tracks. During closing, sunroof 105 moves in a complex arc both forwardly and downwardly as set by the mechanical linkages interfacing with camming surfaces. Latch assembly 905 is configured to respond to that profile to secure the mid-point of rearward portion. This helps reduce NVH contributions from the larger and thinner sunroof 105 (and shallower framework supporting sunroof 105 within the passenger compartment). While it is not necessary that latch engagement assembly 1005 be part of cross bow 505, it is preferred that the structure be stronger/stiffer than the rearward/forward edge of sunroof 105 and can be other static (relative to vehicle body) frame members or supports in the roof like cross bow 505. Latching assembly 905 and latch engagement assembly 1005 are thus in harmony with the kinematic system and offers structural and stiffness synergies as part of a complete system.

A further advantage of system 900 is that latching assembly 905 may be used as a forward hardstop in lieu of hardstops 810. Thus any potential drawbacks of using the larger, thinner sunroof construction to enhance package space (up-down, front-to-rear, and side-to-side volume) are addressed by providing the latching system. One of the space savings is installation of the dual-motors below the roof line (and in a preferred embodiment, near the floor at different sides of the passenger compartment). The use of hardstops helps to address potential fit and finish issues with the use of dual motors, and addressing both hardstop placement and stiffening of sunroof 105 by the latching assembly is even more advantageous as it reduces part count which reduces complexity and can have other advantages.

Fit and finish variations (which can be more easily detected when sunroof 105 is closed) can provide users with dissatisfaction of their vehicle even when they do not negatively impact functional/operational parameters. Conventional solutions sometimes rely on software soft stops (non-physical contact between mechanism system and static frame parts) which can lead to unacceptable fit and finish variations. The physical hardstops (physical contactors) resets fit and finish to design parameters (which removes variations) with each contact. One of the fit and finish parameters is appearance repeatability as measured by gaps between sunroof 105 and other reference elements, which as noted is readily discernible in the closed position. Having the latching system operate as the forward hardstop resets the alignment and removes gap variations with each closure greatly improves the fit and finish, particularly with respect to conventional solutions. The physical hardstops also address a potential issue with use of flexible cables as part of a mechanical interface between the drive motors and the mechanical linkages: namely that the flexible cables may provide hysteresis variations between compression and tension operating modes. (Other mechanical interfaces may also provide hysteresis variations that can be addressed by use of the present invention.) Those variations could negatively impact fit and finish and having hardstops at full open/full close removes fit and finish variations with each operation, whether the mechanical interface is in compression or tension.

It is a preferred embodiment that controller 610 include a computing system that executes computer-program instructions retrieved from a memory to implement one or more of the functions disclosed herein, including commanding motors 605, positioning sunroof 105, and respecting the drive zones.

Figure 12:
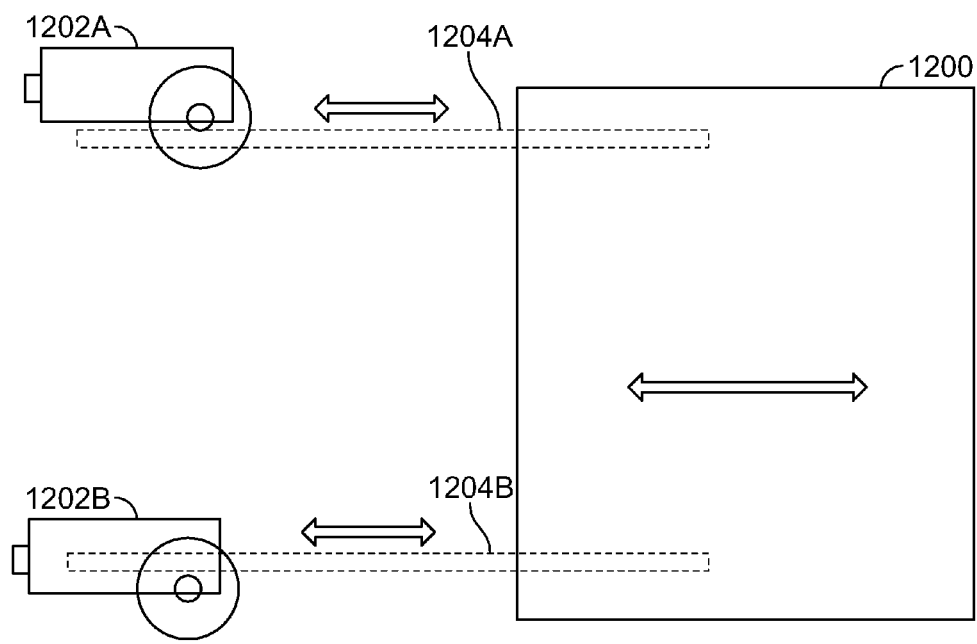
FIG. 12 illustrates an example of a moving panel assembly and two motors.

FIG. 12 illustrates an example of a moving panel assembly 1200 and two motors 1202A-B. Here, the motor 1202A is for the right hand side of the moving panel assembly and is therefore referred to as a right hand motor. The motor 1202B, in turn, is referred to as a left hand motor. The moving panel assembly is connected to the motors 1202A-B by a right hand drive cable 1204A and a left hand drive cable 1204B, respectively.

Figure 13:
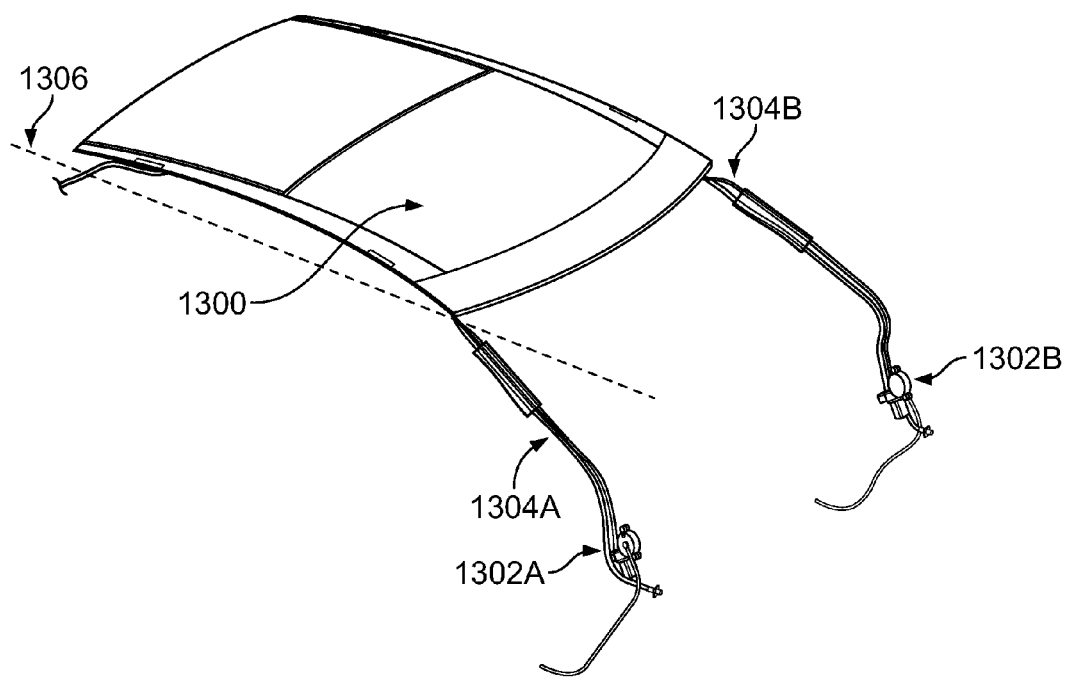
FIG. 13 illusstates another example of a moving panel assembly and two motors.

FIG. 13 illustrates another example of a moving panel assembly 1300 and two motors 1302A-B. The moving panel assembly 1300 is connected to the motors 1302A-B by a right hand drive cable 1304A and a left hand drive cable 1304B, respectively. A roof line 1306 is also indicated.

The system and methods above has been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A moveable panel system for a roof of a passenger compartment of a vehicle, comprising:
    a roof wall of the vehicle having a left lateral edge, a right lateral edge, a front edge, and a rear edge with said roof wall defining a passenger compartment opening between said edges;
    a pair of fore/aft path controls disposed in said roof wall and longitudinally extending from said front edge towards said rear edge including a left path control extending from a front left path limit along said left lateral edge to a rear left path limit and a right path control extending a front right path limit along said right lateral edge to a rear right path limit;
    a plurality of hardstops, one hardstop disposed at each said path limit;
    a panel sized to close said opening;
    a set of mechanical linkages disposed in said path controls and moveably coupling said panel to said path controls, said set of mechanical linkages including a left mechanical linkage coupled to a left side of said panel and a right mechanical linkage coupled to a right side of said panel;
    a left mechanical interface coupled to said left mechanical linkage having an open mode that moves said left side towards said rear edge and said left mechanical interface having a close mode that moves said left side towards said front edge;

a right mechanical interface, independent from said left mechanical interface, coupled to said right mechanical linkage having an open mode that moves said right side towards said rear edge and said right mechanical interface having a close mode that moves said right side towards said front edge;

a pair of motors mounted to the vehicle responsive to a plurality of motor control signals, said pair of motors including a left motor coupled to said left mechanical interface and controlling said modes of said left mechanical interface and including a right motor coupled to said right mechanical interface and controlling said modes of said right mechanical interface; and a motor controller coupled to said motors and generating said plurality of motor control signals including an open control signal and a closed control signal with said open control signal causing said motors to operate their coupled mechanical interfaces in said open mode and with said close control signal causing said motors to operate their coupled mechanical interfaces in said close mode; wherein said open mode drives said mechanical linkages in physical contact with a first particular pair of hardstops of said plurality of hardstops;

said closed mode drives said mechanical linkages in physical contact with a second particular pair of hardstops of said plurality of hardstops, said second particular pair not including hardstops from said first particular pair;

the moveable panel system further comprising a restricted drive zone for each of a terminating portion of said path controls at said path limits wherein said motors provide a reduced drive function for said mechanical interfaces when said linkages enter into any of said restricted drive zones.

2. The moveable panel system of claim 1 wherein said motors are disposed forward of said panel, wherein said open mode for said mechanical interfaces includes pushing said panel rearward; wherein said close mode for said mechanical interfaces includes pulling said panel forward; wherein said first particular pair of hardstops includes hardstops disposed at said rear path limits; and wherein said second particular pair of hardstops includes hardstops disposed at said front path limits.

3. The moveable panel system of claim 1 wherein said motors are disposed to the rear of said panel, wherein said open mode for said mechanical interfaces includes pulling said panel rearward; wherein said close mode for said mechanical interfaces includes pushing said panel forward; wherein said first particular pair of hardstops includes hardstops disposed at said rear path limits; and wherein said second particular pair of hardstops includes hardstops disposed at said front path limits.

4. The moveable panel system of claim 2 wherein said fore/aft path controls comprise a pair of tracks.

5. The moveable panel system of claim 4 wherein one pair of said particular pair of hardstops are disposed in said tracks.

6. A moveable panel system for a roof of a passenger compartment of a vehicle, comprising:

a roof wall of the vehicle having a left lateral edge, a right lateral edge, a front edge, and a rear edge with said roof wall defining a passenger compartment opening between said edges;

a pair of fore/aft path controls disposed in said roof wall and longitudinally extending from said front edge towards said rear edge including a left path control extending from a front left path limit along said left lateral edge to a rear left path limit and a right path control extending a front right path limit along said right lateral edge to a rear right path limit;

a panel sized to close said opening;

a set of mechanical linkages disposed in said path controls and moveably coupling said panel to said path controls, said set of mechanical linkages including a left mechanical linkage coupled to a left side of said panel and a right mechanical linkage coupled to a right side of said panel; and a plurality of hardstops configured to make a physical contact between a hardstop and a moving element associated with said panel as said panel reaches one or more path limits when said panel is fully open or fully closed;

wherein said physical contact reproducibly reduces a misalignment between said sides of said panel moving along said path controls; and wherein a forward hardstop is integrated into a latching assembly coupled to said panel.

7. The moveable panel of claim 6 wherein said hardstops are disposed in one or more of said path controls.

8. A method for operating a sunroof having two independent lateral driving interfaces coupled to lateral edges of the sunroof, the method comprising: moving the sunroof to a fully open mode using the two independent lateral driving interfaces; moving the sunroof to a fully closed position using the two independent lateral driving interfaces; and realigning the lateral edges of the sunroof during one or more of the moving operations by physically contacting a moving element associated with the sunroof with one or more hardstops; and providing a reduced drive function for said independent lateral driving interfaces in restricted drive zones for each of a terminating portion of paths longitudinally extending between path limits.

* * * * *